United States Patent
Park

(10) Patent No.: US 10,785,728 B2
(45) Date of Patent: *Sep. 22, 2020

(54) APPARATUS AND METHOD FOR PERFORMING UPLINK POWER CONTROL IN WIRELESS COMMUNICATION SYSTEM SUPPORTING CARRIER AGGREGATION

(71) Applicant: Huawei Technologies Co., Ltd., Shenzhen (CN)

(72) Inventor: Dong Hyun Park, Seoul (KR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,370

(22) Filed: May 15, 2019

(65) Prior Publication Data

US 2019/0268856 A1 Aug. 29, 2019

Related U.S. Application Data

(63) Continuation of application No. 15/343,524, filed on Nov. 4, 2016, now Pat. No. 10,321,410, which is a (Continued)

(30) Foreign Application Priority Data

Jan. 30, 2015 (KR) .......................... 10-2015-0015415
Jan. 30, 2015 (KR) .......................... 10-2015-0015503

(51) Int. Cl.
*H04W 52/14* (2009.01)
*H04W 72/04* (2009.01)
(Continued)

(52) U.S. Cl.
CPC ......... *H04W 52/146* (2013.01); *H04W 52/58* (2013.01); *H04W 72/042* (2013.01); *H04W 72/0413* (2013.01); *H04W 76/10* (2018.02)

(58) Field of Classification Search
CPC ............... H04W 52/58; H04W 52/146; H04W 72/0413
See application file for complete search history.

(56) References Cited

U.S. PATENT DOCUMENTS 9,042,327 B2    5/2015   Yang et al.
9,503,990 B2 *  11/2016  Park .................... H04W 72/042
(Continued)

FOREIGN PATENT DOCUMENTS

KR    20100073976 A    7/2010
KR    20110040672 A    4/2011
(Continued)

OTHER PUBLICATIONS

U.S. Appl. No. 15/343,524, filed Nov. 4, 2016.
U.S. Appl. No. 15/008,240, filed Jan. 27, 2016.
U.S. Appl. No. 16/393,639, filed Apr. 24, 2019.
"3rd Generation Partnership Project; Technical Specification Group Radio Access Network; Evolved Universal Terrestrial Radio Access (E-UTRA); Radio Resource Control (RRC); Protocol specification(Release 12)," 3GPP TS 36.331 V12.4.1, 3rd Generation Partnership Project, Valbonne, France (Dec. 2014).
(Continued)

*Primary Examiner* — Kevin C. Harper

(57) ABSTRACT

A method of an apparatus controlling transmit power of uplink channels in a wireless communication system is provided. The method includes configuring, for a UE, a primary serving cell on which a first uplink control channel is transmitted from the UE; configuring, for the UE, a secondary serving cell on which a second uplink control channel is transmitted from the UE; configuring a first TPC command and a second TPC command in a single TPC command group, the first TPC command being associated with transmit power of the uplink control information of the primary serving cell, the second TPC command being associated with transmit power of the uplink control information of the secondary serving cell, scrambling downlink control information (DCI) based on an identifier associated with a TPC, the DCI comprising the single TPC command group; transmitting, to the UE, a downlink control channel comprising the scrambled DCI.

18 Claims, 10 Drawing Sheets

Related U.S. Application Data continuation of application No. 15/008,240, filed on Jan. 27, 2016, now Pat. No. 9,503,990.

(51) Int. Cl.
*H04W 52/58* (2009.01)
*H04W 76/10* (2018.01)

(56) References Cited

U.S. PATENT DOCUMENTS

| | | | |
|---|---|---|---|
| 10,321,410 B2 * | 6/2019 | Park | H04W 52/58 |
| 2011/0086659 A1 | 4/2011 | Yoon et al. | |
| 2011/0243087 A1 | 10/2011 | Ahn et al. | |
| 2011/0250918 A1 | 10/2011 | Jen | |
| 2012/0201214 A1 | 8/2012 | Li et al. | |
| 2012/0208583 A1 | 8/2012 | Chung et al. | |
| 2013/0195066 A1 | 8/2013 | Lee et al. | |
| 2013/0201921 A1 | 8/2013 | Chen et al. | |
| 2014/0177500 A1 | 6/2014 | Han et al. | |
| 2015/0071081 A1 | 3/2015 | Gupta et al. | |
| 2015/0156768 A1 | 6/2015 | Guan et al. | |
| 2015/0223213 A1 | 8/2015 | Moon et al. | |
| 2015/0245344 A1 | 8/2015 | You et al. | |
| 2015/0257150 A1 | 9/2015 | Yi et al. | |
| 2015/0351039 A1 | 12/2015 | Yang et al. | |
| 2017/0295006 A1 | 10/2017 | Han et al. | |
| 2018/0077691 A1 | 3/2018 | Seo et al. | |

FOREIGN PATENT DOCUMENTS

| | | | |
|---|---|---|---|
| KR | 20110123199 A | 11/2011 | |
| WO | 2013048570 A1 | 4/2013 | |
| WO | 2014020903 A1 | 2/2014 | |
| WO | 2014077607 A1 | 5/2014 | |

OTHER PUBLICATIONS

"3rd Generation Partnership Project; Technical Specification Group Radio Access Network; Evolved Universal Terrestrial Radio Access (E-UTRA); Services provided by the physical layer (Release 12)," 3GPP TS 36302 V12.2.0, 3GPP Organizational Partners, pp. 1-22, 3rd Generation Partnership Project, Valbonne, France (Dec. 2014).

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.4.0, 3GPP Organizational Partners, pp. 1-60, 3rd Generation Partnership Project, Valbonne, France (Dec. 2014).

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.3.0, 3GPP Organizational Partners, pp. 1-89, 3rd Generation Partnership Project, Valbonne, France (Dec. 2014).

"3rd Generation Partnership Project; Technical Specification Group Radio Access Network; Evolved Universal Terrestrial Radio Access (E-UTRA); Physical layer procedures (Release 12)," 3GPP TS 36.213 V12.4.0, 3GPP Organizational Partners, pp. 1-225, 3rd Generation Partnership Project, Valbonne, France (Dec. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.4.0, 3GPP Organizational Partners, pp. 1-410, 3rd Generation Partnership Project, Valbonne, France Dec. 2014.

* cited by examiner

APPARATUS AND METHOD FOR PERFORMING UPLINK POWER CONTROL IN WIRELESS COMMUNICATION SYSTEM SUPPORTING CARRIER AGGREGATION

CROSS-REFERENCE TO RELATED APPLICATIONS

This application is a continuation of U.S. patent application Ser. No. 15/343,524, filed on Nov. 4, 2016, which is a continuation of U.S. patent application Ser. No. 15/008,240, filed on Jan. 27, 2016, now U.S. Pat. No. 9,503,990, which claims priority from and the benefit of Korean Patent Application Nos. KR10-2015-0015503, filed on Jan. 30, 2015, and KR10-2015-0015415, filed on Jan. 30, 2015. All of the afore-mentioned patent applications are hereby incorporated by reference in their entireties.

BACKGROUND FIELD

Embodiments of the present disclosure relate to wireless communication, and more particularly, to an apparatus and a method for performing uplink power control in a wireless communication system supporting carrier aggregation.

DISCUSSION OF THE BACKGROUND

Carrier aggregation (CA) is used to support a plurality of carriers and is also referred to as spectrum aggregation or bandwidth aggregation. Each aggregated carrier by CA is referred to as a component carrier (CC). Each CC is defined by a bandwidth and center frequency. In CA, a plurality of physically continuous or non-continuous bands is aggregated in the frequency domain, thereby exhibiting an effect of using a logically wider band.

CA basically needs a primary serving cell (PCell) serving as an anchor in communications and a secondary serving cell (SCell). In existing Long-Term Evolution (LTE), an uplink control channel, such as a physical uplink control channel (PUCCH), is transmitted only in the PCell.

Meanwhile, uplink transmission power control of a user equipment (UE) is a technique for solving interference or attenuation according to a distance between the UE and a base station (BS), which is also referred to as a transmission power control (TPC) command. The TPC command is signaling transmitted to the UE from the BS in order to perform power control of a PUCCH or physical uplink shared channel (PUSCH). The TPC command allows the BS to receive an uplink signal with a constant intensity of power.

Currently, a TPC command for a PUCCH or PUSCH is applied to a CA supporting UE and a CA non-supporting UE through a common control region of a PCell. The present disclosure suggests a new power control method for a PUCCH or PUSCH transmission of various serving cell group configurations.

SUMMARY

An exemplary embodiment provides an apparatus and a method for performing uplink power control in a wireless communication system supporting carrier aggregation.

According to one or more exemplar embodiment, a base station, e.g., an evolved NodeB, controls transmit power of uplink channels in a wireless communication system. The base station may include a system including a processor, an RF module, and a memory. For example, the system of the base station may include the processor 1060, the RF module 1065, and the memory 1055 shown in FIG. 10.

In an example, one or more processors of the base station may configure, for a UE, a primary serving cell on which a first uplink control channel is transmitted from the UE. The first uplink control channel may include uplink control information of the primary serving cell. The one or more processors of the base station may configure, for the UE, a secondary serving cell on which a second uplink control channel is transmitted from the UE. The second uplink control channel may include uplink control information of the secondary serving cell. Further, the one or more processors of the base station may configure a first TPC command and a second TPC command in a single TPC command group, the first TPC command being associated with transmit power of the uplink control information of the primary serving cell, the second TPC command being associated with transmit power of the uplink control information of the secondary serving cell.

The one or more processors of the base station may scramble downlink control information based on an identifier associated with a TPC. The downlink control information includes the single TPC command group.

One or more RF modules may transmit, to the UE, a downlink control channel including the scrambled downlink control information.

According to one or more exemplary embodiment, a system of a base station to transmit a TPC command in a wireless communication system supporting CA is provided.

One or more RF modules of the base station may establish a connection with a UE through a primary serving cell (PCell), and transmit, to the UE, a Radio Resource Control (RRC) message. The RRC message may include a first Transmit Power Control (TPC) index associated with a Physical Uplink Control Channel (PUCCH) transmission on the PCell and a second TPC index associated with a PUCCH transmission on a secondary serving cell (SCell), the SCell together with the PCell being configured as serving cells for the UE.

The one or more RF modules may transmit a Physical Downlink Control Channel (PDCCH) by mapping the PDCCH to a common search space of the PCell. A Downlink Control Information (DCI) format of the PDCCH may include a first TPC command for controlling transmit power of the PUCCH transmission on the PCell and a second TPC command for controlling transmit power of the PUCCH transmission on the SCell.

One or more processors of the base station may determine a value of the first TPC command to control transmit power of the PUCCH transmission on the PCell and determine a value of the second TPC command to control transmit power of the PUCCH transmission on the SCell, the value of the first TPC command being mapped in the DCI format based on the first TPC index and the value of the second TPC command being mapped in the DCI format based on the second TPC index.

According to one or more exemplary embodiment, a system for a UE to receive a TPC command in a wireless communication system supporting CA is provided. The system for the UE may include a processor, an RF module, and a memory. For example, the system may be a system-on-chip and may include the processor 1010, the RF module 1020, and the memory 1025 shown in FIG. 10.

An RF module of the system may be configured to establish a connection with a base station through a primary serving cell (PCell), and to receive a Radio Resource Control (RRC) message. The RRC message may include a first Transmit Power Control (TPC) index associated with a Physical Uplink Control Channel (PUCCH) transmission on the PCell and a second TPC index associated with a PUCCH transmission on a secondary serving cell (SCell), the SCell together with the PCell being configured as serving cells for the UE.

A processor of the system may be configured to detect a Physical Downlink Control Channel (PDCCH) by monitoring a common search space of the PCell. A Downlink Control Information (DCI) format of the PDCCH may include a first TPC command for controlling transmit power of the PUCCH transmission on the PCell and a second TPC command for controlling transmit power of the PUCCH transmission on the SCell. The processor may be configured to identify the first TPC command and the second TPC command from the DCI format based on the first TPC index and the second TPC index, respectively, to control transmit power of the PUCCH transmission on the PCell based on a value of the first TPC command, and to control transmit power of the PUCCH transmission on the SCell based on a value of the second TPC command.

According to one or more exemplary embodiments, power control for a PUCCH or PUSCH configured on a secondary serving cell may be performed, thereby effectively supporting CA in LTE.

DETAILED DESCRIPTION OF THE ILLUSTRATED EMBODIMENTS

Figure 1:
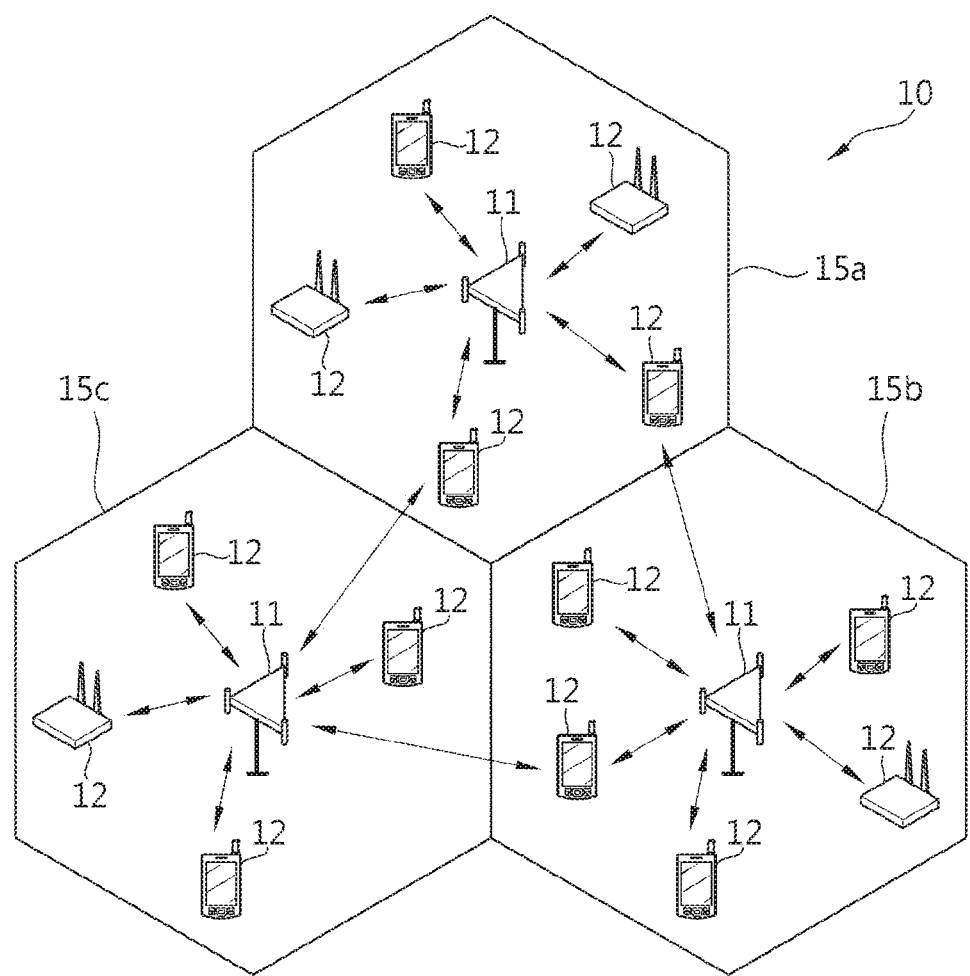
FIG. 1 is a block diagram illustrating a wireless communication system according to one or more exemplary embodiments.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

FIG. 1 illustrates a wireless communication system according to one or more exemplary embodiment.

Referring to FIG. 1, the wireless communication system 10 is widely located to provide a variety of communication services such as a voice service and a packet data service. The wireless communication system 10 includes one or more evolved-NodeBs (eNBs) 11. Each eNB 11 provides a communication service to a predetermined cell, for example, cells 15a, 15b, and 15c. Here, the cell may be divided into a plurality of areas (also, referred to as sectors).

User equipment 12 (UE) may be located at a certain location or portable, and may also be referred to as different terms, including MS (mobile station), MT (mobile terminal), UT (user terminal), SS (subscriber station), wireless device, PDA (personal digital assistant), wireless modem, and handheld device. An eNB 11 may also be referred to as BS (Base Station), BTS (Base Transceiver System), Access Point, femto base station, Home nodeB, relay and the like. A cell inclusively refers to various coverage areas, such as mega cell, macro cell, micro cell, pico cell, and femto cell. A cell may be used as a term for indicating a frequency band that a BS provides, a coverage of a BS, or a BS.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

The layers of a radio interface protocol between a UE and a BS may be classified as a first layer (L1), a second layer (L2), and a third layer (L3), based on three low layers of an Open System interconnection (OSI) model, which is well known in association with a communication system. A physical layer belonging to the L1 among the layers, provides an information transfer service using a physical channel. A physical layer is connected to a media access control (MAC) layer corresponding to an upper layer through a transport channel. Data is transferred between the MAC layer and the physical layer through the transport channel. The transport channel is classified based on a method used to transport data through a radio interface. Further, data is transferred between different physical layers, for example, between a physical layer of a user equipment (UE) and a physical layer of an eNB through a physical channel. The physical channel may be modulated using an orthogonal frequency division multiplexing (OFDM) method and uses, as radio resources, a time, a frequency, and a space generated with a plurality of antennas.

Hereinafter, a multiple carrier system includes the system that supports carrier aggregation. Contiguous CA and/or non-contiguous CA may be used in the multiple carrier system; in addition, both symmetric aggregation and asymmetric aggregation may be used in the multiple carrier system as well. A serving cell may be defined as a component frequency band based on multiple CC system which may be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell may be used together with a PCell to form an aggregation of serving cells, the cell used with a PCell is referred to as an SCell. An aggregation of serving cells which configured for a user equipment may include one PCell, or one PCell together with at least one SCell. A serving cell is activated or deactivated. Uplink transmission power control of a UE is performed by a Transmission Power Control (TPC) command. A TPC command is a signaling that a BS transmits to a UE in order to perform PUCCH or PUSCH power control. With the introduction of a PUCCH (SCell) in LTE, when a PUCCH (SCell) is additionally configured for a CA-configured UE, a portion of pieces of uplink control information (UCI) transmitted only on an existing PUCCH (PCell) may be sent via the PUCCH (SCell). Also, pieces of UCI may also be sent on the PUSCH (SCell) depending on the presence of an uplink grant. Thus, to effectively support PUCCH (SCell)-based CA, power control for a PUCCH (SCell) or PUSCH is required as well as in a PCell.

Figure 2:
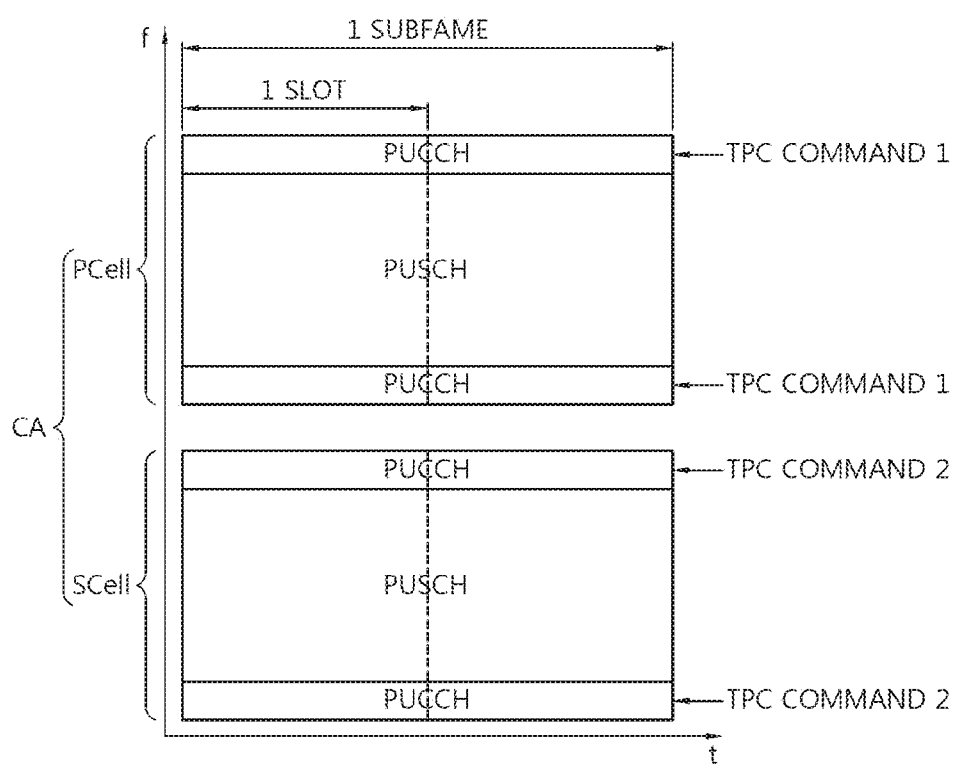
FIG. 2 illustrates an example of application of a TPC command in a channel structure of a serving cell according to one or more exemplary embodiments.

FIG. 2 illustrates an example of application of a TPC command in a channel structure of a serving cell according to one or more exemplary embodiments.

Referring to FIG. 2, a PCell and a SCell are configured by CA for a UE. PUCCH regions and PUSCH regions are divided on the frequency axis of the serving cells. Transmission power for a signal in the PUCCH regions and a signal in the PUSCH regions may be controlled by a group TPC command. The group TPC command is a TPC command for a UE group. That is, the group TPC command includes TPC commands respectively for a plurality of UEs. For improving CA in LTE, a technique of transmitting a PUCCH in an SCell may be used. When a PUCCH transmission is configured in the SCell as well as in the PCell, overhead due to uplink control information (UCI) concentrated on the PCell may be reduced. Further, it is useful for deploying a small cell providing efficient uplink transmission. As a result, it is possible to transmit an uplink control signal with reliability. When at least one of the UEs supports a PUCCH (SCell), the group TPC command may include TPC commands of the PCell and the SCell for the same UE.

According to one or more exemplary embodiments, a base station and a user equipment may be configured to provide a radio communication scheme that supports CA of one or more SCells operating in an unlicensed band or an unlicensed spectrum with a PCell based on a support of the PCell operating in a licensed band or a licensed spectrum. Each band may include one or more subcarriers and may be referred to as a component carrier.

In an example, a first UE (UE1) may perform CA of carriers from among at least five licensed carriers and an unlicensed carrier, and a second UE (UE2) and a third UE (UE3) may perform CA of carriers from among five licensed carriers and an unlicensed carrier. The first UE UE1 may be configured to utilize maximum 32 component carriers (CCs) and support CA of maximum 16 CCs from among the maximum 32 CCs. The UE1, the UE2, and the UE3 may configure a licensed carrier as a PCell or an SCell and perform CA of the licensed carrier and an unlicensed carrier configured as an SCell. In such a scheme, various configurations may be applied with respect to downlink(DL)/uplink (UL) control signaling. In order to support CA using maximum 32 CCs on physical (PHY) layer and medium access control (MAC) layer, excessive signaling overhead may occur. Such signaling overhead may be reduced through a Radio Resource Control (RRC) signaling scheme described below.

Table 1 is an example showing a scheme in which 25 CCs are divided into 4 groups and configured.

TABLE 1

| RRC signaling | | | |
| --- | --- | --- | --- |
| First serving cell group (SGC#0 (support maximum 8 CCs)) | Second serving cell group (SGC#1 (support maximum 8 CCs)) | Third serving cell group (SGC#2 (support maximum 8 CCs)) | Fourth serving cell group (SGC#3 (support maximum 8 CCs)) |
| PCell(self-scheduling) | SCell#0(Cross-carrier scheduling) | SCell#0(Cross-carrier scheduling) | SCell#0(self-scheduling) |
| SCell#1 | SCell#1 | SCell#1 | SCell#1 |
| SCell#2 | SCell#2 | SCell#2 | SCell#2 |
| SCell#3 | SCell#3 | SCell#3 | SCell#3 |
| SCell#4 | SCell#4 | SCell#4 | SCell#4 |
| SCell#5 | SCell#5 | SCell#5 | SCell#5 |
| SCell#6 | | | |

Referring to Table 1, the number of serving cell groups may be determined based on the number of CCs configured in a UE and the maximum number of CCs configurable in one serving cell group. Table 1 shows an example configuration when maximum 8 CCs can be configured in one serving cell group.

In another example, two serving cell groups may be configured. In a first serving cell group SCG #0, maximum 16 serving cells (or CCs) including a PCell may be configured. In a second serving cell group SCG #1, maximum 16 serving cells may be configured. If a UE supports PUCCH SCell and a base station configures the PUCCH SCell in the second serving cell group SCG #1, maximum 16 serving cells (or CCs) including the PUCCH SCell may be configured in the second serving cell group SCG #1.

The PUCCH SCell is one of SCells configured for the UE by the base station and is a unique SCell on which a PUCCH transmission other than a default PUCCH transmission on PCell is enabled. Through the PUCCH SCell, overhead of Uplink Control Information (UCI) transmitted by an uplink on the PCell may be distributed (or offloaded) from the PCell to the PUCCH SCell, thereby enhancing system performance. According to one or more exemplary embodiments, if a primary serving cell group including a PCell and a secondary serving cell group including a PUCCH SCell are configured for a single UE, at least two Transmit Power Control (TPC) commands for the single UE may be generated and transmitted. The single UE may be configured with more than one PUCCH SCells and the number of TPC commands for the single UE may increase in accordance with the increased number of PUCCH SCells. The secondary serving cell group does not include a PCell.

A group of TPC commands ("TPC commands group") may include a plurality of TPC commands. The TPC commands group may control transmit power of an uplink transmission on serving cells in the primary serving cell group ("PUCCH PCell group") and control transmit power of an uplink transmission on serving cells in the secondary serving cell group ("PUCCH SCell group"). The TPC commands group may control transmit power of a PUSCH transmission ("uplink data channel transmission") on serving cells of the primary serving cell group and the secondary serving cell group as well as transmit powers of a PUCCH transmission on the PCell and a PUCCH transmission on the PUCCH SCell(s). The PUCCH of the PCell may include UCI of the PCell and other SCells included in the primary serving cell group, and the PUCCH of the PUCCH SCell may include UCI of SCells included in the secondary serving cell group.

Signals in the PUCCH regions for which power is controlled by the group TPC command may include periodic CSI reporting, HARQ-ACK, SR, or the like.

In operations to which the group TPC command for PUCCH/PUSCH transmission power control of each serving cell is applied, the PUCCH (PCell) is controlled by TPC command 1, and the PUCCH (SCell) is controlled by TPC command 2 (for convenience, a TPC command for a PUSCH is omitted in the preset embodiment).

Here, TPC commands 1 and 2 may be included in one group TPC command or in different group TPC commands. That is, TPC command 1 and TPC command 2 may be provided via a piece of downlink control information (DCI) or different pieces of DCI. DCI is transmitted to a UE in a common search space through a PDCCH.

In the present embodiment, it is assumed that one PCell and one SCell are configured for one UE and there are two TPC commands accordingly, which is provided for illustrative purpose only. Alternatively, one or more PUCCH-configured SCells may be present for one UE, and the number of TPC commands may increase accordingly. Although a group TPC command is described simply as controlling a PUCCH (PCell) (hereinafter, referred to as a PUCCH (PCell)) and a PUCCH (SCell) (hereinafter, referred to as a PUCCH (SCell)) hereinafter, the group TPC command may control not only a primary serving cell and a PUCCH (SCell) but also a PUSCH.

Hereinafter, a method of performing uplink power control by a group TPC command according to one or more exemplary embodiment will be described in detail.

Figure 3:
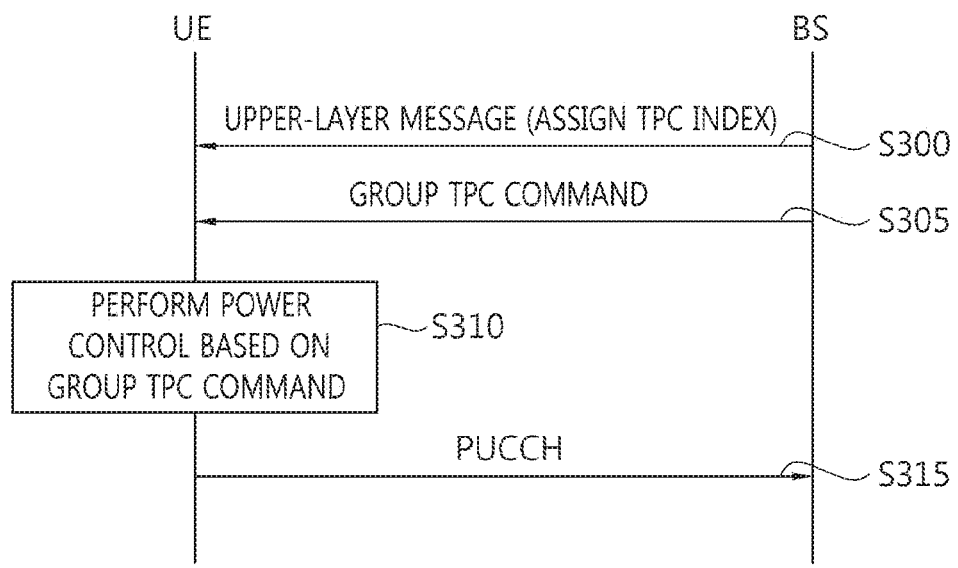
FIG. 3 is a flowchart illustrating uplink power control according to one or more exemplary embodiments.

FIG. 3 is a flowchart illustrating uplink power control according to one or more exemplary embodiment.

Referring to FIG. 3, a BS transmits an upper-layer message to assign a TPC index to a UE (S300). The TPC index determines an index to a TPC command for the UE. The TPC index may have a value of N or M, in which N and M are distinguished based on a DCI format. For example, in the case of DCI format 3, the TPC index has a value of N, and in the case of DCI format 3A, the TPC index has a value of M. The upper-layer message may be an RRC message. For example, the RRC message is TPC-PDCCH-Config, which is used to specify indexes and RNTIs for PUCCH and PUSCH power control. PUCCH and PUSCH power control may be set up or canceled using TPC-PDCCH-Config.

In the present embodiment, a plurality of TPC indexes may be present for the UE, be assigned to a PCell and a SCell of the UE, and correspond to TPC commands for the PCell and the SCell, respectively. For example, the TPC indexes may include a first TPC index for a PUCCH (PCell) and a second TPC index for a PUCCH (SCell). The second TPC index may be an additional index to the first TPC index. The upper-layer message (for example, RRC message or TPC-PDCCH-Config) for configuring both the first TPC index and the second TPC index may have a structure in the following table.

TABLE 2

```
-- ASN1START
TPC-PDCCH-Config ::=            CHOICE {
    release                         NULL,
    setup                           SEQUENCE {
        tpc-RNTI                        BIT STRING (SIZE (16)),
        tpc-Index                       [TPC-Index, TPC-Index_r13]
    }
}
TPC-Index ::=                   CHOICE {
    indexOfFormat3                  INTEGER (1..15),
    indexOfFormat3A                 INTEGER (1..31)
TPC-Index_r13(SCell PUCCH) ::=  CHOICE {
    indexOfFormat3                  INTEGER (1..15),
    indexOfFormat3A                 INTEGER (1..31)
}
-- ASN1STOP
```

Referring to Table 2, a tpc-Index field indicates [TPC-Index, TPC-Index_r13]. Here, a TPC-Index field indicates the first TPC index and has a value of indexOfFormat3 or indexOfFormat3A according to DCI format. The indexOfFormat3 is a natural number of 1 to 15, and the indexOfFormat3A is a natural number of 1 to 31. Meanwhile, a TPC-Index_r13 field indicates the second TPC index and has a value of indexOfFormat3 or indexOfFormat3A according to DCI format. The indexOfFormat3 is a natural number of 1 to 15, and the indexOfFormat3A is a natural number of 1 to 31.

The UE receiving the upper-layer message uses the TPC-Index field as a TPC index to a TPC command for the PUCCH (PCell) and the TPC-Index_r13 field as a TPC index to a TPC command for the PUCCH (SCell). That is, the UE may distinguish the TPC index for the PCell and the TPC index for the SCell. The first TPC index and the second TPC index may be set by the BS independently and individually, or in connection with each other or identically. The UE may perform power control for PUCCH (PCell) and PUCCH (SCell) transmissions using the two TPC indexes. The TPC-Index_r13 field may be replaced with a name including a SCell-related term, such as TPC-Index SCell. Here, the PUCCH for the PCell and the PUCCH for the SCell may belong to one UE.

When the BS provides the plurality of TPC indexes set in S300 to the UE, the UE establishes TPC settings for the PCell and the SCell.

Subsequently, the BS transmits a group TPC command to the UE (S305). The group TPC command is transmitted, being included in DCI. The length and content of the group TPC command may vary depending on a DCI format used for transmission of the group TPC command. In the case of DCI format 3, the group TPC command is "TPC command number 1, TPC command number 2, . . . , TPC command number N." In the case of DCI format 3A, the group TPC command is "TPC command number 1, TPC command number 2, . . . , TPC command number M." N and M are parameters illustrated in Table 2. According to one or more exemplary embodiment, both DCI formats 3 and 3A may be used to transmit the group TPC command, and other DCI formats are also available.

In order that the UE or BS performs both power control for PUCCH (PCell) and power control for PUCCH (SCell), various embodiments of group TPC commands may be used in S305.

In one embodiment, the group TPC command is a single group TPC command, in which a single group TPC command is included in a piece of DCI. The DCI including the single group TPC command is mapped to a PDCCH scrambled with a TPC-PUCCH RNTI and transmitted. Further, the DCI including the single group TPC command is transmitted on the PCell (see FIG. 5).

Figure 4:
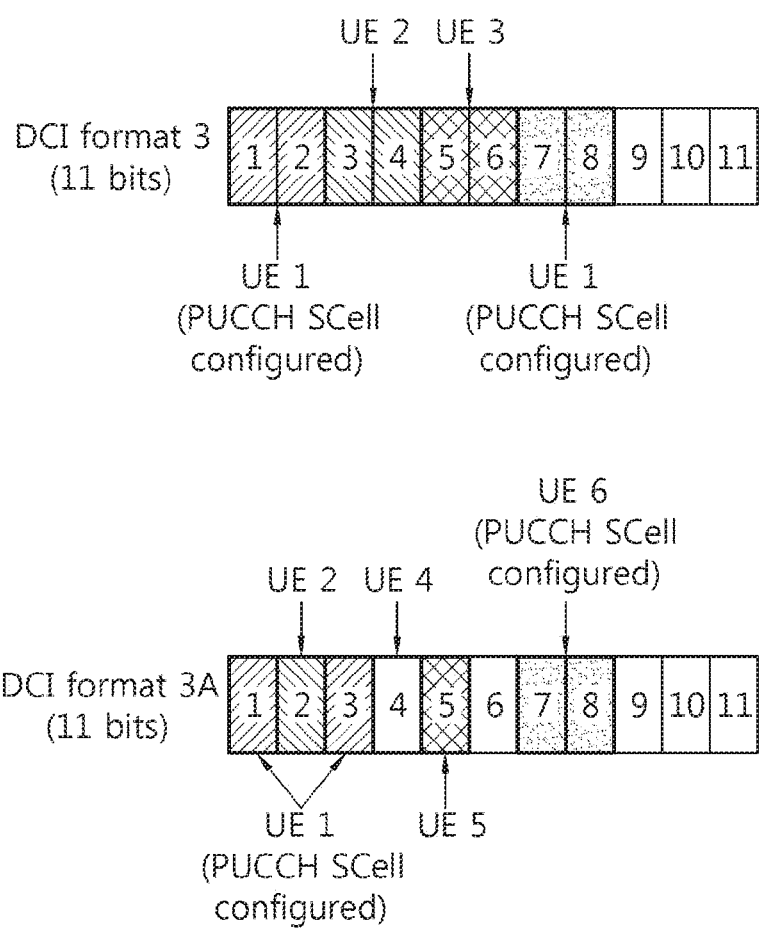
FIG. 4 illustrates an example of a corresponding relationship between a TPC index and a group TPC command.

For example, a corresponding relationship between a TPC index and a group TPC command is illustrated in FIG. 4. Referring to FIG. 4, DCI format 3 and DCI format 3A have specific lengths, which are, for example, 11 bits in FIG. 4.

In an example of DCI format 3, UE1, UE2, and UE3 performs PUCCH power control by a single group TPC command. Since a PUCCH (SCell) is configured only for UE1 among UE1 to UE3, an additional TPC command (2 bits) for PUCCH (SCell) power control is allocated to UE1. A PUCCH (SCell) is not configured for UE2 and UE3. In DCI format 3, every two bits are one TPC command, and TPC commands sequentially correspond to particular TPC indexes, respectively. First and second bits (or TPC command 1) correspond to TPC index 1, third and fourth bits (or TPC command 2) to TPC index 2, fifth and sixth bits (or TPC command 3) to TPC index 3, and seventh and eighth bits (or TPC command 4) to TPC index 4. It is set in advance which UE or serving cell each TPC index is for through the signaling in Table 5. For example, TPC index 1 is for a PUCCH (PCell) of UE1, and TPC index 4 is for a PUCCH (SCell) of UE1. That is, since the PUCCH (SCell) is configured only for UE1, the additional TPC command (2 bits) for PUCCH (SCell) power control is allocated to UE1.

Next, in an example of DCI format 3A, UE1 to UE6 performs PUCCH/PUSCH power control by a single group TPC command. Since PUCCH (SCell)s are configured for UE1 and UE6 among UE1 to UE6, an additional TPC command (1 bit) for PUCCH (SCell) power control is allocated to UE1 and UE6. In DCI format 3A, each one bit is one TPC command, and TPC commands sequentially correspond to particular TPC indexes, respectively. A first bit (or TPC command 1), second bit (or TPC command 2), third bit (or TPC command 3), fourth bit (or TPC command 4), . . . , and M-th bit (or TPC command M) correspond to TPC index 1, TPC index 2, TPC index 3, TPC index 4, . . . , and TPC index M, respectively. It is set in advance which UE or serving cell each TPC index is for through the signaling in Table 5. For example, TPC index 1 is for a PUCCH (PCell) of UE1, and TPC index 3 is for a PUCCH (SCell) of UE1. Also, TPC index 7 is for a PUCCH (PCell) of UE6, and TPC index 8 is for a PUCCH (SCell) of UE6.

Referring back to FIG. 3, in another embodiment, the group TPC command is multiple group TPC commands, in which a first group TPC command (PUCCH (PCell) power control) and a second group TPC command (PUCCH (SCell) power control) are included in different pieces of DCI. Both first DCI including the first group TPC command and second DCI including the second group TPC command are transmitted on the PCell (see FIGS. 6 and 7).

In still another embodiment, the group TPC command is multiple group TPC commands, in which a first group TPC command (PUCCH (PCell) power control) and a second group TPC command (PUCCH (SCell) power control) are included in different pieces of DCI. First DCI including the first group TPC command is transmitted on the PCell, and second DCI including the second group TPC command is transmitted on the SCell (see FIG. 8).

The UE receives the DCI including the group TPC command and performs PUCCH and PUSCH power control in the PCell and the SCell based on the group TPC command (S310). Specifically, power control according to the group TPC command may be performed based on an accumulative power control mode. For example, when the UE receives a group TPC command for a PUCCH-configured SCell, the UE accumulates a PUCCH power control value according to the group TPC command and a previous value.

For example, the UE may perform the foregoing accumulation operation based on the following equation.

$$g(i) = g(i-1) + \sum_{m=0}^{M-1} \delta_{PUCCH}(i - k_m) \quad \text{[Equation 1]}$$

$\delta_{PUCCH}$ is a value corresponding to a group TPC command indicated to the UE through DCI format 3/3A, which is expressed in dB and illustrated in Table 3 and Table 4 below.

TABLE 3

| TPC command field in DCI format 3A | $\delta_{PUCCH[dB]}$ |
|---|---|
| 0 | −1 |
| 1 | 1 |

TABLE 4

| TPC command field in DCI format 1A/1B/1D/1/2A/2B/2C/2D/2/3 | $\delta_{PUCCH[dB]}$ |
|---|---|
| 0 | −1 |
| 1 | 0 |
| 2 | 1 |
| 3 | 3 |

Referring to Table 3 and Table 4, Table 3 illustrates a mapping relationship between a group TPC command and $\delta_{PUCCH}$ in DCI format 1A/1B/1D/1/2A/2B/2C/2D/2/3, and Table 4 illustrates a mapping relationship between a group TPC command and $\delta_{PUCCH}$ in DCI format 3A.

In Equation 1, g(i) represents a current PUCCH power control adjustment state. In FDD, M=1. In TDD, M is the number of downlink subframes associated with transmission of one PUCCH, which may vary according to downlink HARQ timing. $k_m$ is a downlink HARQ timing value indicating each associated downlink subframe, which refers to an n-$k_m$ downlink subframe when a current subframe is n. $k_m$ is illustrated, for example, in Table 5.

TABLE 5

| UL/DL configuration | 0 | 1 | 2 | 3 | 4 | 5 | 6 | 7 | 8 | 9 |
|---|---|---|---|---|---|---|---|---|---|---|
| | | | subframe n | | | | | | | |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The UE transmits a PUCCH and/or PUSCH to the BS on the PCell and/or SCell based on power controlled in S310 (S315).

Hereinafter, various embodiments of transmission of the group TPC command described in S305 will be described in detail with reference to the drawings.

Figure 5:
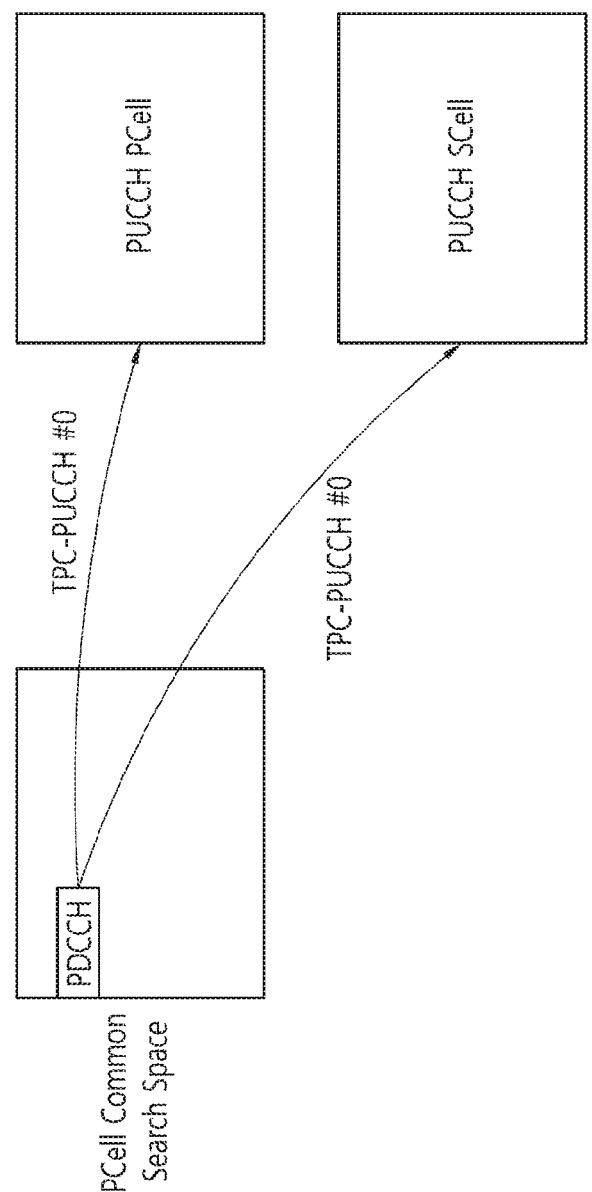
FIG. 5 illustrates a method of transmitting a group TPC command and performing monitoring according to one or more exemplary embodiments.

FIG. 5 illustrates a method of transmitting a group TPC command and performing monitoring according to one or more exemplary embodiment.

Referring to FIG. 5, a first TPC command for a PUCCH (PCell) and a second TPC command for a PUCCH (SCell) are included in a single group TPC command and mapped to a piece of DCI. That is, in the present embodiment, a piece of DCI is shared for power control for both the PUCCH (PCell) and the PUCCH (SCell). An example of the DCI including the single group TPC command may be illustrated in FIG. 4.

The DCI including the single group TPC command according to the present embodiment is mapped to a PDCCH scrambled with TPC-PUCCH #0 (RNTI) and transmitted. The PDCCH (PDCCH with TPC-PUCCH RNTI) related to the single group TPC command is mapped to a common search space (CSS) on a PCell. In BS and UE operations, the BS generates a piece of DCI for power control for both the PUCCH (PCell) and the PUCCH (SCell), scrambles a PDCCH including the DCI with a TPC-PUCCH RNTI (accurately scrambled with a CRC bit), maps the scrambled PDCCH to the CSS of the PCell, and transmits the PDCCH to the UE. The UE monitors the CSS of the PCell in order to receive the TPC command on the PUCCH (SCell). In this respect, the present embodiment is different from monitoring two CSSs (CSSs on PCell and PSCell) by two dual connectivity-configured UEs.

Other examples of a PDCCH mapped to the CSS includes a PDCCH scrambled with a Random Access-Radio Network Temporary Identifier (RA-RNTI), a PDCCH scrambled with a common-RNTI (C-RNTI), a PDCCH scrambled with a temporary C-RNTI (TC-RNTI), a PDCCH scrambled with a TPC-PUSCH-RNTI, a PDCCH scrambled with an eIMTA-RNTI, a PDCCH scrambled with an SPS-RNTI, a PDCCH scrambled with a P-RNTI, a PDCCH scrambled with an SI-RNTI, or the like.

Figure 6:
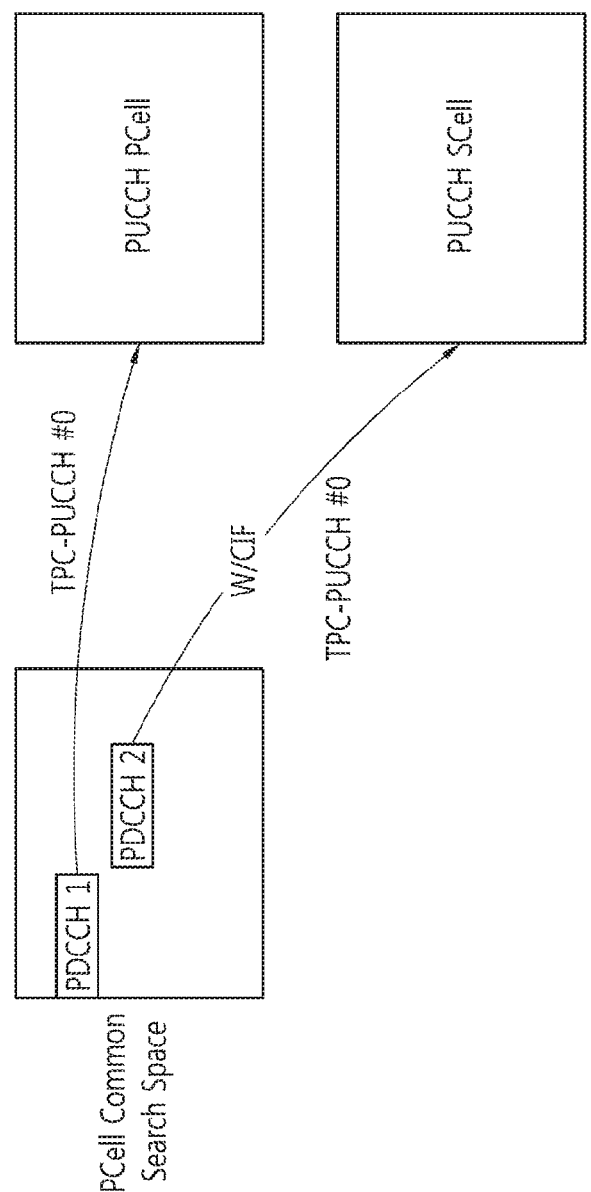
FIG. 6 illustrates a method of transmitting a group TPC command and performing monitoring according to one or more exemplary embodiments.

FIG. 6 illustrates a method of transmitting a group TPC command and performing monitoring according to one or more exemplary embodiment.

Referring to FIG. 6, a first group TPC command for a PUCCH (PCell) and a second group TPC command for a PUCCH (SCell) are included in different pieces of DCI. Both first DCI including the first group TPC command and second DCI including the second group TPC command are transmitted on the PCell. The first DCI is transmitted, being mapped to PDCCH1 scrambled with a TPC-PUCCH #0 RNTI, and the second DCI is transmitted, being mapped to PDCCH2 scrambled with a TPC-PUCCH #0 RNTI. That is, one TPC-PUCCH RNTI value is commonly applied to two PDCCHs having different TPC commands (or different pieces of DCI). Further, both PDCCH1 and PDCCH2 are mapped to a CSS on a PCell. Since PDCCH1 and PDCCH2 are mapped to the same CSS and the same TPC-PUCCH RNTI value is applied to PDCCH1 and PDCCH2, information for distinguishing PDCCH1 and PDCCH2 is necessary.

For example, a carrier indicator field (CIF) may be used to distinguish PDCCH1 and PDCCH2. Specifically, the second DCI related to the PUCCH (SCell) may include the CIF. In other words, the CIF may be used to distinguish the first DCI and the second DCI. That is, the CIF may be used to distinguish the first group TPC command and the second group TPC command. In this case, the BS may configure cross carrier scheduling in a CCS for PUCCH (SCell)-configured UEs through RRC signaling, similarly to cross carrier scheduling configurable in a UE-specific search space. Here, a CIF value activated in the DCI serves as an indicator which indicates only the DCI for the PUCCH (SCell), not a serving cell transmitting a PDSCH or PUSCH as in a UE-specific search space. Thus, only one bit may be used as a CIF value. In the presence of two or more PUCCH (SCell)-configured SCells, a bit value may be increased for the CIF value accordingly. For example, when a one-bit CIF value is 0, a UE recognizes that corresponding DCI provides a group TPC command for a PUCCH (SCell). However, when a one-bit CIF value is 1, the CIF is reserved. Thus, cross carrier scheduling in the CCS is configured through RRC signaling and is indicated (or activated) with a three-bit CIF or one-bit CIF in the DCI based on an RRC signaling configuration. Unused fields in the CIF are reserved. The UE needs to monitor a CSS of the PCell in order to receive the group TPC command for the PUCCH (SCell). An RRC signaling information element for cross carrier scheduling is illustrated below. Here, in order to indicate cross carrier scheduling on the PCell, schedulingCellId needs to have a value of a serving cell index of the PCell (that is, 0). Further, cif-presence is activated and only three bits or one bit is activated in DCI (format 3/3A).

TABLE 6

```
-- ASN1START
CrossCarrierSchedulingConfig ::=   SEQUENCE {
    schedulingCellInfo            CHOICE {
        own                       SEQUENCE { -- No cross carrier scheduling
            cif-Presence              BOOLEAN
        },
        other                     SEQUENCE { -- Cross carrier scheduling
```

TABLE 6-continued

```
        schedulingCellId        ServCellIndex,
        pdsch-Start             INTEGER (1..4)
        }
    }
}
-- ASN1STOP
```

In BS and UE operations, the BS generates first DCI for PUCCH (PCell) power control and second DCI for the PUCCH (SCell) power control. Here, the BS includes a CIF indicating the PCell in the second DCI. The BS scrambles PDCCH1 including the first DCI with a TPC-PUCCH RNTI and PDCCH2 including the second DCI with a TPC-PUCCH RNTI. The BS maps the scrambled PDCCH1 and PDCCH2 to the CSS of the PCell and transmits to the UE. The UE monitors the CSS of the PCell in order to receive a TPC command on the PUCCH (SCell).

According to the present embodiment, cross carrier scheduling is enabled not only for PDCCHs mapped to a UE-specific search space (USS) but also for PDCCHs mapped to a CSS. Further, as a CIF is used, it is not necessary to introduce a separate RNTI for distinguishing PDCCH1 and PDCCH2.

Figure 7:
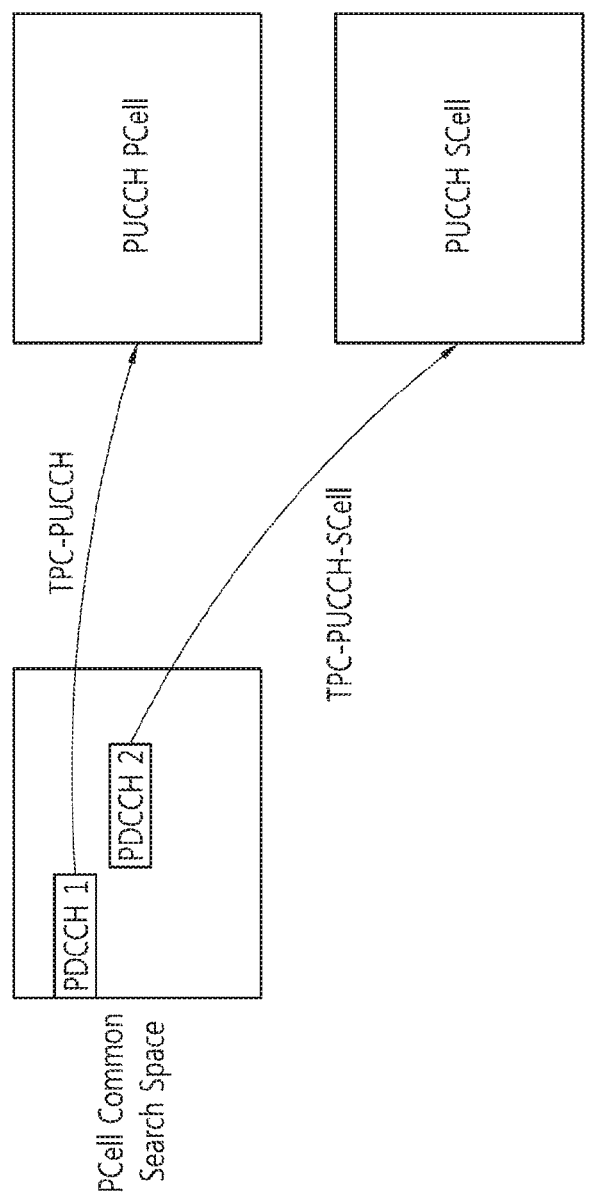
FIG. 7 illustrates a method of transmitting a group TPC command and performing monitoring according to one or more exemplary embodiments.

FIG. 7 illustrates a method of transmitting a group TPC command and performing monitoring according to one or more exemplary embodiment. FIG. 7 is different from FIG. 6 in that a new RNTI is used with respect to PDCCH2 transmitted on a CSS of a PCell.

Referring to FIG. 7, a first group TPC command for a PUCCH (PCell) and a second group TPC command for a PUCCH (SCell) are included in different pieces of DCI. Both first DCI including the first group TPC command and second DCI including the second group TPC command are transmitted on the PCell. The first DCI is transmitted, being mapped to PDCCH1 scrambled with a TPC-PUCCH #0 RNTI, and the second DCI is transmitted, being mapped to PDCCH2 scrambled with a TPC-PUCCH-SCell RNTI. That is, different RNTI values are applied to two PDCCHs having different TPC commands (or different pieces of DCI). The new TPC_PUCCH-SCell RNTI defined for PUCCH (SCell) power control in the present embodiment may be replaced with a different term performing the same function.

Meanwhile, both PDCCH1 and PDCCH2 are mapped to the CSS on the PCell. PDCCH1 and PDCCH2 are mapped to the same CSS but scrambled with different RNTI values, and thus information for distinguishing PDCCH1 and PDCCH2 is not necessary. That is, since different RNTI values and different TPC indexes are applied to the respective PDCCHs, which are then transmitted, it is not needed to set a CIF value.

In BS and UE operations, the BS generates first DCI for PUCCH (PCell) power control and second DCI for the PUCCH (SCell) power control. The BS scrambles PDCCH1 including the first DCI with a TPC-PUCCH RNTI and PDCCH2 including the second DCI with a TPC-PUCCH-SCell RNTI. The BS maps the scrambled PDCCH1 and PDCCH2 to the CSS of the PCell and transmits to the UE. The UE monitors the CSS of the PCell using the TPC-PUCCH-SCell RNTI in order to receive a TPC command on the PUCCH (SCell).

Figure 8:
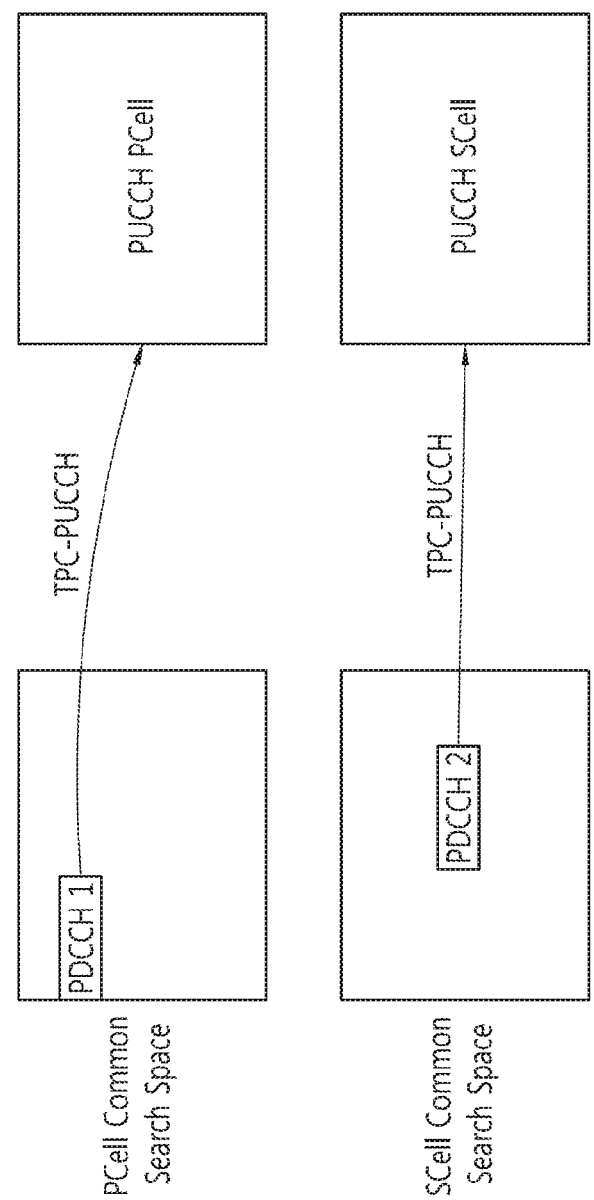
FIG. 8 illustrates a method of transmitting a group TPC command and performing monitoring according to one or more exemplary embodiments.

FIG. 8 illustrates a method of transmitting a group TPC command and performing monitoring according to one or more exemplary embodiment.

Referring to FIG. 8, a first group TPC command for a PUCCH (PCell) and a second group TPC command for a PUCCH (SCell) are included in different pieces of DCI. First DCI including the first group TPC command is transmitted on a PCell, and second DCI including the second group TPC command is transmitted on a SCell.

The first DCI is mapped to PDCCH1 scrambled with a TPC-PUCCH RNTI, and PDCCH1 is mapped to a CSS of the PCell. The second DCI is mapped to PDCCH2 scrambled with a TPC-PUCCH RNTI, and PDCCH2 is mapped to a CSS of the SCell.

To receive PDCCH2, the UE needs to recognize in advance that PDCCH2 is mapped to the CSS of the SCell. The BS and the UE may implicitly agree that PDCCH2 is mapped to the CSS of the SCell, or the BS may explicitly notify the UE that PDCCH2 is mapped to the CSS of the SCell.

For example, the UE may transmit, to the BS, capability information indicating that Multimedia Broadcast Multicast Service (MBMS) is supportable, and the BS receiving the capability information may map PDCCH2 to the CSS of the SCell. That is, the capability information may be implicit information transmitted to the BS so that PDCCH2 is transmitted, being mapped to the CSS of the SCell. The UE transmitting the capability information implicitly recognizes that the UE needs to monitor the CSS of the SCell to receive the group TPC command for the PUCCH (SCell).

The foregoing operation is possible for the following reason. A Physical MBMS Channel (PMCH) that is an MBMS-related physical channel is transmitted on a carrier (or SCell) other than the PCell, and a PDCCH (PDCCH with M-RNTI) needed to decode the PMCH is mapped to the CSS of the carrier (or SCell) transmitting the PMCH, not to the PCell. Thus, in order that the MBMS-supportable UE receives the MBMS, the UE needs to monitor the CSS on the SCell transmitting the PMCH, not on the PCell. Since the UE needs to monitor the CSS of the SCell in order to receive the MBMS, it is possible to simultaneously monitor PDCCH2 related to the group TPC command for the PUCCH (SCell) in the CSS on the SCell. Here, the SCell includes an uplink component carrier (UL CC) transmitting the PUCCH (SCell) and a downlink component carrier (DL CC) connected to the UL CC via SIB-2. Thus, the UE monitors the PDCCH scrambled with the TPC-PUCCH RNTI in the CSS on the DL CC.

In the present embodiment, in order that the UE monitors the CSS on the SCell to receive PDCCH2, it is required that i) the UE transmits, to the BS, capability information indicating that MBMS is supportable, and ii) the PUCCH (SCell) is configured for the UE. That is, when the UE can support MBMS and support the PUCCH (SCell), the UE may monitor the CSS on the SCell in order to receive the group TPC command (or DCI). In other words, the UE having UE capability corresponding to mbms-SCell supports the PUCCH (SCell), which is configured by the BS, the UE monitors the CSS on the DL CC(SCell) connected to the UL CC(SCell) transmitting the PUCCH (SCell) via an SIB-2 link in order to receive the group TPC command for PUCCH (SCell) power control.

The capability information (mbms-SCell-r11) indicating that MBMS is supportable may be defined as in Table 7. The capability information may be included in MBMS parameter information (MBMS-Parameters-r11).

TABLE 7

```
MBMS-Parameters-r11 ::=        SEQUENCE {
    mbms-SCell-r11             ENUMERATED {supported}
```

TABLE 7-continued

| | |
|---|---|
| mbms-NonServingCell-r11 | OPTIONAL,<br>ENUMERATED {supported}<br>OPTIONAL |
| } | |

Referring to Table, the MBMS parameter information (MBMS-Parameters-r11) may be information included in UE-EUTRA-Capability IE. mbms-SCell-r11 is capability information indicating that MBMS is supportable in a SCell and may optionally be included in the MBMS parameter information. mbms-SCell-r11 displaying {supported} represents that a corresponding UE can support reception of MBMS in the SCell.

When the capability information indicating that MBMS is supportable displays "supported," the UE is expected to monitor the CSS on the SCell in order to the group TPC command for the PUCCH (SCell) later, because the UE can monitor the CSS on the SCell or a non-serving cell.

Alternatively, regardless of whether the UE can support MBMS, when the UE supports the PUCCH (SCell) (or when the PUCCH (SCell) is configured), the UE may monitor the CSS on the SCell in order to implicitly receive PDCCH2. In this case, the BS may also implicitly map PDCCH2 on the CSS on the SCell and transmit to the UE.

Figure 9:
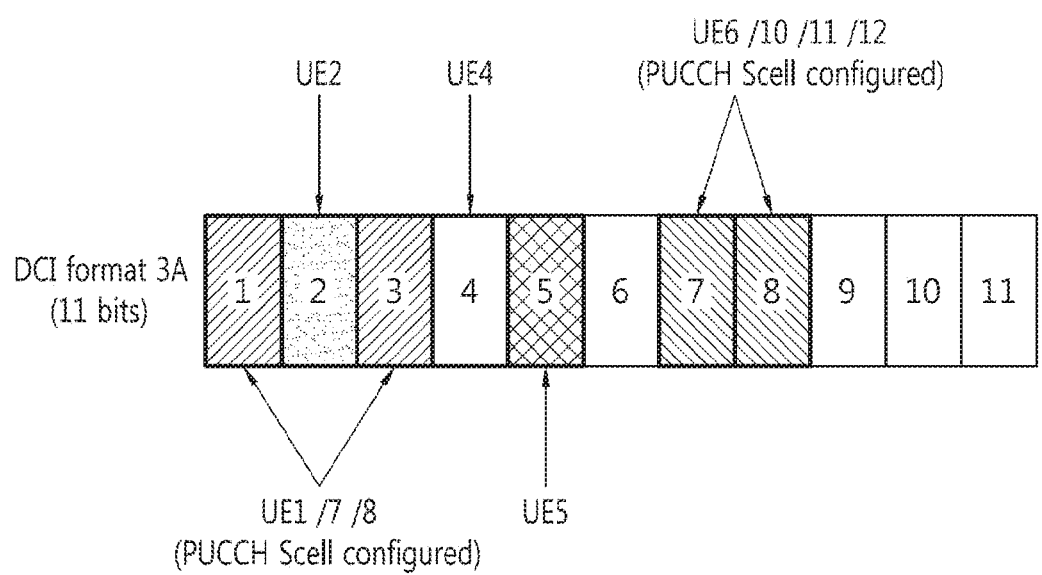
FIG. 9 illustrates an example of a corresponding relationship between a TPC index and a group TPC command according to one or more exemplary embodiments.

FIG. 9 illustrates an example of a corresponding relationship between a TPC index and a group TPC command according to one or more exemplary embodiment.

Referring to FIG. 9, the BS may set a TPC index set by upper-layer signaling commonly for each UE. That is, unlike in FIG. 4, the TPC index may be shared between UEs, instead of setting different TPC indexes for the UEs. This method is effective only for new PUCCH (SCell)-configured UEs and may be applicable to a case where a TPC index is indicated using a DCI format, as in a UE (FIG. 5), or a case where a TPC index is indicated through other DCI by exclusively using PUCCH (SCell) (FIG. 6, 7 or 8), which is described in detail as follows.

Legacy UES, UEs 2/4/5, are configured as in conventionally, and the same TPC index is set for new UEs, UEs 1/7/8 and UEs 6/10/11/12. The BS may provide a power value in a time-divided manner to the UEs (e.g. UE1/7/8 or UE6/10/11/12). To divide time, the following equation is used.

$$\lfloor n_s/2 \rfloor \bmod K = i (0 \leq i < K) \quad \text{[Equation 2]}$$

Referring to Equation 2, K is the number of UEs sharing one TPC index. In this example, K=3 or K=4. For example, in K=3, that is, UEs 1/7/8, the BS set in advance i=0 for UE1, i=1 for UE7, and i=2 for UE8, thereby providing different TPC indexes to the three UEs by subframe. The UEs may share a bit value in the same TPC field through a subframe corresponding to the value of each i. Accordingly, a TPC index may efficiently be utilized to provide a group TPC command value.

Figure 10:
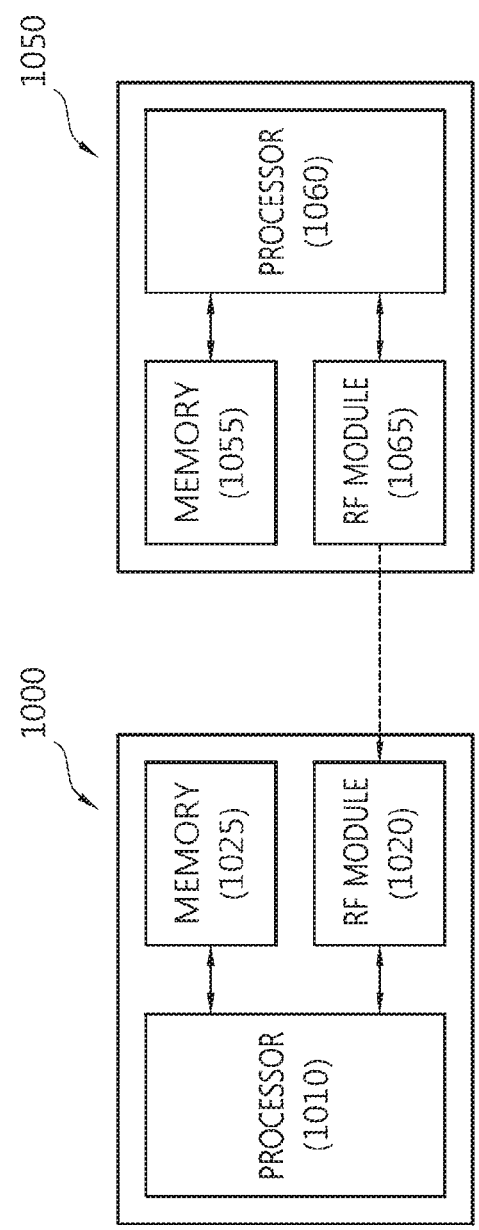
FIG. 10 is a block diagram illustrating a user equipment and a base station according to one or more exemplary embodiments.

FIG. 10 is a block diagram illustrating a UE and a BS according to one or more exemplary embodiment.

Referring to FIG. 10, the UE 1000 includes a processor 1010, a radio frequency (RF) module 1020, and a memory 1025. The memory 1025 is connected to the processor 1010 and stores various pieces of information to drive the processor 1010. The RF module 1020 is connected to the processor 1010 and transmits and/or receives a radio signal.

The RF module 1020 receives an upper-layer message to assign a TPC index from the BS 1050. Definition and functions of the TPC index are described in S300. The upper-layer message may be an RRC message. For example, the RRC message is TPC-PDCCH-Config in Table 2, which is used to specify indexes and RNTIs for PUCCH and PUSCH power control. PUCCH and PUSCH power control may be set up or canceled using TPC-PDCCH-Config. A first TPC index and a second TPC index may be set by a processor 1060 of the BS 1050 independently and individually, or in connection with each other or identically.

The processor 1010 implements functions, processes and/or methods of the UE suggested in FIGS. 2 to 8 in the present specification. Specifically, when the RF module 1020 receives the upper-layer message, the processor 1010 establishes TPC settings for the PCell and the SCell. The processor 1010 uses a TPC-Index field as a TPC index to a TPC command for a PUCCH (PCell) and a TPC-Index_r13 field as a TPC index to a TPC command for a PUCCH (SCell). That is, the processor 1010 may distinguish the TPC index for the PCell and the TPC index for the SCell. The processor 1010 may perform power control for the PUCCH (PCell) and the PUCCH (SCell) transmissions using the two TPC indexes.

Further, the RF module 1020 receives a group TPC command from the BS 1050. The group TPC command is transmitted, being included in DCI. Definition and functions of the group TPC command are described in S305. In order that the processor 1010 performs both power control for the PUCCH (PCell) and power control for the PUCCH (SCell), various embodiments of group TPC commands may be used in S305. As a method of transmitting a group TPC command, the embodiments illustrated in FIGS. 5 to 8 may be used.

In one embodiment, the processor 1010 monitors a CSS of the PCell in order to receive a TPC command on the PUCCH (SCell).

In another embodiment, the processor 1010 monitors the CSS of the PCell using a TPC-PUCCH-SCell RNTI in order to receive a TPC command on the PUCCH (SCell).

In still another embodiment, the processor 1010 generates capability information indicating that MBMS is supportable and sends the capability information to the RF module 1020, and the RF module 1020 may transmit a message in Table 3 to the BS 1050. The processor 1010 monitors a CSS of the SCell in order to receive the MBMS, simultaneously with monitoring PDCCH2 related to the group TPC command for the PUCCH (SCell) in the CSS on the SCell.

In yet another embodiment, regardless of whether the UE 1000 can support MBMS, when the UE 1000 supports the PUCCH (SCell) (or when the PUCCH (SCell) is configured), the processor 1010 may monitor the CSS on the SCell in order to implicitly receive PDCCH2.

When the group TPC command is received by monitoring, the processor 1010 performs PUCCH and PUSCH power control in the PCell and the SCell based on the group TPC command. Specifically, the processor 1010 may perform power control for the PUCCH of the SCell based on an accumulative power control mode. For example, when a group TPC command for a PUCCH-configured SCell is received, the processor 1010 accumulates a PUCCH power control value according to the group TPC command and a previous value.

The RF module 1065 transmits the PUCCH (PCell) and/or PUCCH (SCell) from the UE 1000 to the BS 1050 according to power controlled by the group TPC command.

The BS 1050 includes a memory 1055, a processor 1060, and a RF module 1065. The memory 1055 is connected to the processor 1060 and stores various pieces of information to drive the processor 1060. The RF module 1065 is connected to the processor 1060 and transmits and/or receives a radio signal. Specifically, the RF module 1065 transmits an upper-layer message to assign a TPC index to the UE 1000. The RF module 1065 transmits a group TPC command to the UE 1000 on a PCell and/or SCell. Further, the RF module 1065 receives capability information related to MBMS in Table 3 from the UE 1000. The RF module 1065 receives a PUCCH (PCell) and/or PUCCH (SCell) from the UE 1000.

The processor 1060 implements functions, processes and/or methods related to the BS illustrated in FIGS. 2 to 8 in the present specification.

In one embodiment, the processor 1060 generates a piece of DCI for power control for both of a PUCCH (PCell) and a PUCCH (SCell), scrambles a PDCCH including the generated DCI with a TPC-PUCCH RNTI, and maps the scrambled PDCCH to a CSS of the PCell.

In another embodiment, the processor 1060 generates first DCI for PUCCH (PCell) power control and second DCI for PUCCH (SCell) power control. Here, the processor 1060 includes a CIF indicating the PCell in the second DCI. The processor 1060 scrambles PDCCH1 including the first DCI with a TPC-PUCCH RNTI and PDCCH2 including the second DCI with a TPC-PUCCH RNTI. The processor 1060 maps the scrambled PDCCH1 and PDCCH2 to the CSS of the PCell.

In still another embodiment, the processor 1060 generates first DCI for PUCCH (PCell) power control and second DCI for PUCCH (SCell) power control. The processor 1060 scrambles PDCCH1 including the first DCI with a TPC-PUCCH RNTI and PDCCH2 including the second DCI with a TPC-PUCCH-SCell RNTI. The processor 1060 maps the scrambled PDCCH1 and PDCCH2 to the CSS of the PCell.

In yet another embodiment, the processor 1060 maps PDCCH1 scrambled with the TPC-PUCCH RNTI to the CSS of the PCell and maps PDCCH2 scrambled with the TPC-PUCCH RNTI to a CSS of the SCell. This is a case where the RF module 1060 receives, from the UE 1000, capability information indicating that MBMS is supportable.

According to one or more exemplar embodiment, a base station, e.g., an evolved NodeB, controls transmit power of uplink channels in a wireless communication system. The base station may include a system including a processor, an RF module, and a memory. For example, the system of the base station may include the processor 1060, the RF module 1065, and the memory 1055 shown in FIG. 10.

In an example, one or more processors of the base station may configure, for a UE, a primary serving cell on which a first uplink control channel is transmitted from the UE. The first uplink control channel may include uplink control information of the primary serving cell. The one or more processors of the base station may configure, for the UE, a secondary serving cell on which a second uplink control channel is transmitted from the UE. The second uplink control channel may include uplink control information of the secondary serving cell. Further, the one or more processors of the base station may configure a first TPC command and a second TPC command in a single TPC command group, the first TPC command being associated with transmit power of the uplink control information of the primary serving cell, the second TPC command being associated with transmit power of the uplink control information of the secondary serving cell.

The one or more processors of the base station may scramble downlink control information based on an identifier associated with a TPC. The downlink control information includes the single TPC command group.

One or more RF modules may transmit, to the UE, a downlink control channel including the scrambled downlink control information. Further, the one or more RF modules ma establish a connection with the UE through the primary serving cell, and receive a Radio Resource Control (RRC) message through the primary serving cell.

The one or more processors of the base station may assign an index for the first TPC command and an index for the second TPC command. The index for the first TPC command associated with the primary serving cell configured for the UE is different from the index for the second TPC command associated with the secondary serving cell configured for the UE.

The one or more RF modules may transmit, through a Radio Resource Control (RRC) message, a TPC-Physical Downlink Control Channel (PDCCH)-Config message to assign, for the UE, the index for the first TPC command and the index for the second TPC command. For example, the downlink control channel is a PDCCH associated with the TPC-PDCCH-Config message.

As described above, the index for the first TPC command may have different bit sizes, according to downlink control information format 3 or downlink control information format 3A. Further, the index for the second TPC command may have different bit sizes, according to downlink control information format 3 or downlink control information format 3A. The single TPC command group may include a third TPC command for controlling transmit power of an uplink channel of another UE. In an example, a first piece of downlink control information including the single TPC command group is scrambled using a first TPC Physical Uplink Control Channel (PUCCH) Radio Network Temporary Identifier (RNTI), and a second piece of downlink control information different from the first piece of downlink control information is scrambled using a second TPC PUCCH RNTI. The first TPC PUCCH RNTI and second TPC PUCCH RNTI have different values.

The first TPC command is associated with transmit power of the first uplink control channel, and the first uplink control channel may further include uplink control information of at least one secondary serving cell grouped, together with the primary serving cell, in a first serving cell group. The second TPC command is associated with transmit power of the second uplink control channel, and the second uplink control channel may further include uplink control information of at least one secondary serving cell grouped, together with the secondary serving cell, in a second serving cell group.

The one or more processors may map the downlink control channel to a common search space of the primary serving cell for the transmission of the downlink control channel.

According to one or more exemplary embodiment, a system of a base station to transmit a TPC command in a wireless communication system supporting CA is provided.

One or more RF modules of the base station may establish a connection with a UE through a primary serving cell (PCell), and transmit, to the UE, a Radio Resource Control (RRC) message. The RRC message may include a first Transmit Power Control (TPC) index associated with a Physical Uplink Control Channel (PUCCH) transmission on the PCell and a second TPC index associated with a PUCCH transmission on a secondary serving cell (SCell), the SCell together with the PCell being configured as serving cells for the UE.

The one or more RF modules may transmit a Physical Downlink Control Channel (PDCCH) by mapping the PDCCH to a common search space of the PCell. A Downlink Control Information (DCI) format of the PDCCH may include a first TPC command for controlling transmit power of the PUCCH transmission on the PCell and a second TPC command for controlling transmit power of the PUCCH transmission on the SCell.

One or more processors of the base station may determine a value of the first TPC command to control transmit power of the PUCCH transmission on the PCell and determine a value of the second TPC command to control transmit power of the PUCCH transmission on the SCell, the value of the first TPC command being mapped in the DCI format based on the first TPC index and the value of the second TPC command being mapped in the DCI format based on the second TPC index.

According to one or more exemplary embodiment, a system for a UE to receive a TPC command in a wireless communication system supporting CA is provided. The system for the UE may include a processor, an RF module, and a memory. For example, the system may be a system-on-chip and may include the processor 1010, the RF module 1020, and the memory 1025 shown in FIG. 10.

An RF module of the system may be configured to establish a connection with a base station through a primary serving cell (PCell), and to receive a Radio Resource Control (RRC) message. The RRC message may include a first Transmit Power Control (TPC) index associated with a Physical Uplink Control Channel (PUCCH) transmission on the PCell and a second TPC index associated with a PUCCH transmission on a secondary serving cell (SCell), the SCell together with the PCell being configured as serving cells for the UE.

A processor of the system may be configured to detect a Physical Downlink Control Channel (PDCCH) by monitoring a common search space of the PCell. A Downlink Control Information (DCI) format of the PDCCH may include a first TPC command for controlling transmit power of the PUCCH transmission on the PCell and a second TPC command for controlling transmit power of the PUCCH transmission on the SCell. The processor may be configured to identify the first TPC command and the second TPC command from the DCI format based on the first TPC index and the second TPC index, respectively, to control transmit power of the PUCCH transmission on the PCell based on a value of the first TPC command, and to control transmit power of the PUCCH transmission on the SCell based on a value of the second TPC command.

The RF module may configure a CA for the UE using the PCell and a plurality of SCells. The processor may determine the PUCCH transmission on the SCell selected from among the plurality of SCells. The RRC message is received through the PCell.

The DCI format may correspond to DCI format 3, and each of the first TPC index and the second TPC index corresponds to different 2-bit data of the DCI format 3.

the DCI format may correspond to DCI format 3A, and each of the first TPC index and the second TPC index corresponds to different 1-bit data of the DCI format 3A. The DCI format may include a third TPC command for controlling transmit power of the PUCCH transmission of another UE.

The processor may identify the first TPC command, the second TPC command, and the third TPC command from the PDCCH scrambled with one TPC PUCCH Radio Network Temporary Identifier (RNTI). The RRC message may further include information of the TPC PUCCH RNTI. The processor may determine first uplink control information (UCI) to be included in the PUCCH transmission on the PCell, and second UCI to be included in the PUCCH transmission on the SCell.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF modules may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A method applied to a base station, the method comprising:
   configuring, for a user equipment (UE), a first uplink carrier on which a first physical uplink shared channel (PUSCH) is transmitted from the UE;
   configuring, for the UE, a second uplink carrier on which a second PUSCH is transmitted from the UE;
   configuring, for the UE, a first transmit power control (TPC) command and a second TPC command in a single TPC command group, the first TPC command being associated with transmit power of the first PUSCH, the second TPC command being associated with transmit power of the second PUSCH;
   assigning a first index for the first TPC command and a second index for the second TPC command;
   scrambling downlink control information (DCI) based on an identifier associated with a TPC, the DCI comprising the single TPC command group;
   transmitting the scrambled DCI to the UE.

2. The method of claim 1, further comprising:
   mapping the DCI to physical downlink control channel (PDCCH), wherein the DCI is scrambled with a TPC-PUSCH radio network temporary identifier (RNTI).

3. The method of claim 1, wherein the first index is different from the second index.

4. The method of claim 1, further comprising:
   transmitting, through a radio resource control (RRC) message, the first index for the first TPC command and the second index for the second TPC command, to the UE.

5. The method of claim 1, wherein the single TPC command group comprises a third TPC command for controlling transmit power of an uplink channel of another UE.

6. A method applied to a user equipment, the method comprising:
   receiving, from a base station, configuration information, wherein the configuration information comprises all (a), (b) and (c):
   (a) configuration of a first uplink carrier on which a first physical uplink shared channel (PUSCH) is transmitted, (b) configuration of a second uplink carrier on which a second PUSCH is transmitted, and
(c) configuration of a first transmit power control (TPC) command associated with the first PUSCH and a first index for the first TPC command, configuration of a second TPC command associated with the second PUSCH and a second index for the second TPC command, wherein the first TPC command and the second TPC command are in a single TPC command group;

receiving a physical downlink control channel (PDCCH), wherein a downlink control information (DCI) format of the PDCCH comprises the single TPC command group;

identifying the first TPC command and the second TPC command from the DCI format of the PDCCH based on the first index and the second index, respectively;

determining first transmit power of the first PUSCH according to the first TPC command and second transmission power of the second PUSCH according to the second TPC command;

transmitting the first PUSCH using the first transmit power and the second PUSCH using the second transmission power.

7. The method of claim 6, wherein the DCI format of the PDCCH is scrambled with a TPC-PUSCH radio network temporary identifier (RNTI).

8. The method of claim 6, wherein the first index is different from the second index.

9. The method of claim 6, wherein the configuration information is received through a radio resource control (RRC) message.

10. The method of claim 6, wherein the single TPC command group comprises a third TPC command for controlling transmit power of an uplink channel of another UE.

11. The method of claim 7, wherein the configuration information further comprises information of the TPC PUSCH RNTI.

12. A base station, comprising:
at least one processor configured to:
configure, for a user equipment (UE), a first uplink carrier on which a first physical uplink shared channel (PUSCH) is transmitted from the UE;
configure, for the UE, a second uplink carrier on which a second PUSCH is transmitted from the UE;
configure a first transmit power control (TPC) command and a second TPC command in a single TPC command group, the first TPC command being associated with transmit power of the first PUSCH, the second TPC command being associated with transmit power of the second PUSCH;
assign a first index for the first TPC command and a second index for the second TPC command; and
scramble downlink control information (DCI) based on an identifier associated with a TPC, the DCI comprising the single TPC command group; and
a transceiver, configured to cooperate with the at least one processor to transmit the scrambled DCI to the UE.

13. The base station of claim 12, wherein
the at least one processor is further configured to map the DCI to physical downlink control channel (PDCCH), wherein the DCI is scrambled with a TPC-PUSCH radio network temporary identifier (RNTI).

14. The base station of claim 12, wherein the first index is different from the second index.

15. The base station of claim 12, wherein:
the transceiver, is further configured to cooperate with the at least one processor to transmit, through a radio resource control (RRC) message, the first index for the first TPC command and the second index for the second TPC command, to the UE.

16. The base station of claim 12, wherein the single TPC command group comprises a third TPC command for controlling transmit power of an uplink channel of another UE.

17. The method of claim 6, further comprising:
receiving, through a radio resource control (RRC) message, the first index for the first TPC command and the second index for the second TPC command, from the base station.

18. The method of claim 6, wherein the single TPC command group comprises a third TPC command for controlling transmit power of an uplink channel of another UE.

* * * * *